UNITED STATES PATENT OFFICE.

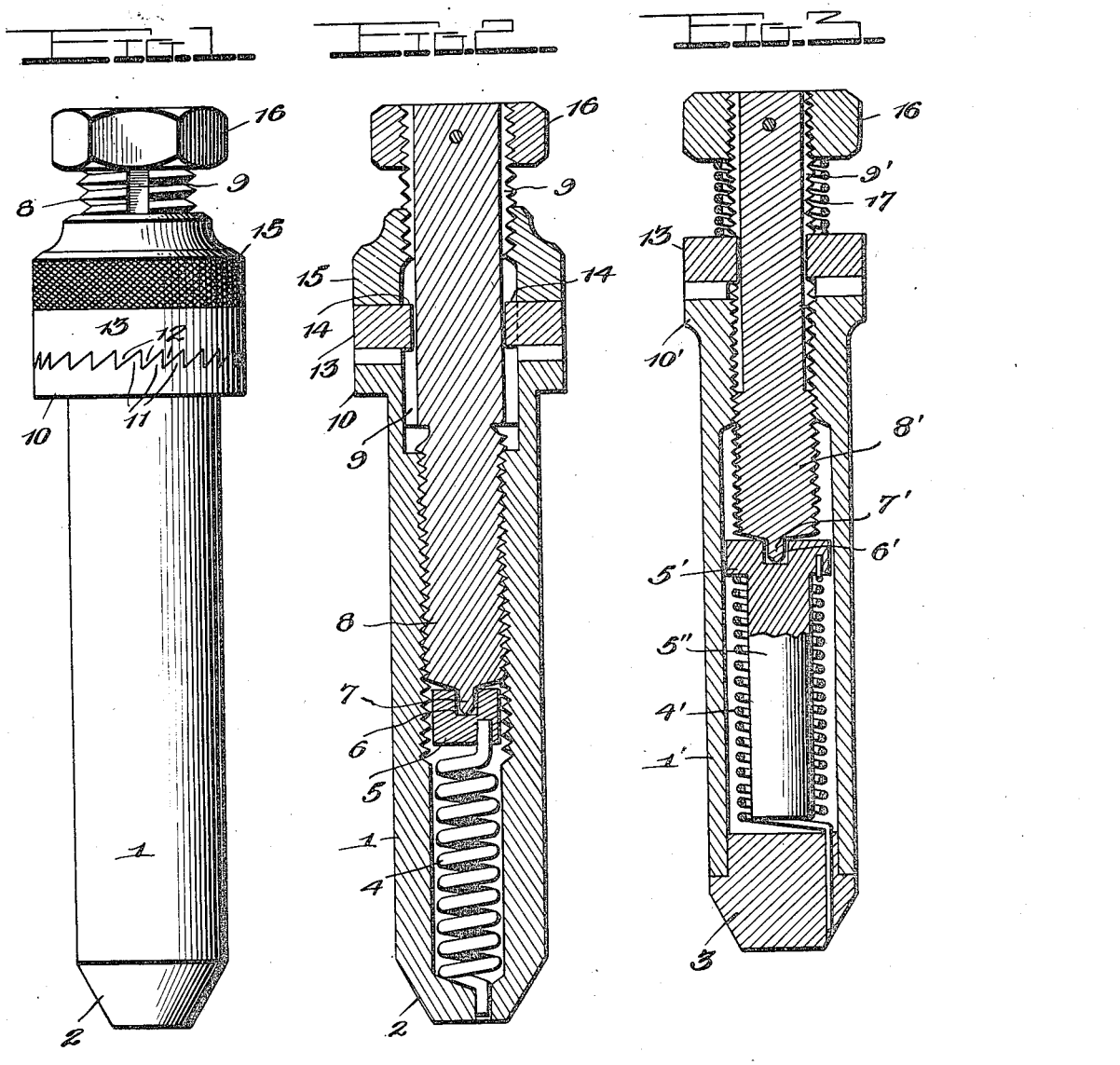

RODNEY W. MANNING, OF RIVERSIDE, RHODE ISLAND.

TAPPET FOR VALVE MECHANISMS OF EXPLOSIVE-ENGINES.

1,193,913. Specification of Letters Patent. Patented Aug. 8, 1916.

Application filed March 15, 1916. Serial No. 84,330.

*To all whom it may concern:*

Be it known that I, RODNEY W. MANNING, of Riverside, in the county of Providence and State of Rhode Island, have invented a new and useful Improvement in Tappets for Valve Mechanisms of Explosive-Engines, of which the following is a specification.

This invention relates to certain new and useful improvements in tappets for valve mechanisms of explosive engines and aims to provide such a device which may readily be adjusted to compensate for the wear incident to and accompanying the operation in an engine.

The invention further resides in the salient features of construction and arrangements of parts hereinafter described, succinctly defined in the appended claims, and illustrated in the preferred embodiment in the accompanying drawings wherein—

Figure 1 is a side elevation of a tappet constructed in accordance with the present invention. Fig. 2 is a longitudinal section thereof, and Fig. 3 is a similar sectional view of a tappet embodying a slight modification of the invention.

Employing like characters of reference for corresponding parts throughout, the numeral 1 designates the casing having a suitably hardened end 2, as in Figs. 1 and 2, or a hardened end plug 3. To the end 2 is anchored one terminal of a coiled torsional spring 4, the opposite terminal being secured to a loose plug follower 5 which is grooved at 6 to receive the flange or blade extension 7 of a rod 8. This rod is screw threaded into the casing 1 and projects from the opened end thereof, said projecting end being threaded and formed with a spline groove 9. The opened end of the casing is enlarged, as at 10, and formed with an annular series of radially extending saw or ratchet teeth 11 with which the reversely arranged teeth 12 of a disk 13 may interlock, the disk being centrally apertured to receive the projecting end of the rod and provided with feathers 14 to slightly engage in the grooves 9. A knurled nut 15 threaded on the rod 8 is so adjusted relative to the disk 13 as to prevent the teeth 12 from lifting out of engagement with the teeth 11. Thus, manual adjustment is necessary to accommodate for the wear between the top of the rod 8 and the valve stem (not shown). A nut 16 is secured to the top of the rod to enlarge the bearing surface for the valve stem.

In Fig. 3, the lower end of the coiled spring 4' is fixed to the hardened plug 3 and its upper end is anchored to a loose plug follower 5' which has a depending central stem 5'' extending within the coils of the spring to serve in maintaining the plug upright. This follower 5', like the follower 5, is formed with a groove 6' for releasably receiving the flange 7' of the screw threaded rod 8'. The enlargement 10' of casing 1' is serrated to provide teeth 11 which engage with the teeth 12 of the disk 13. The feathers of disk 13 slide in the groove 9' of the rod to eliminate relative rotation.

In this second form of the invention, the rod is adjusted out of the casing automatically, the teeth 12 of the disk being held in engagement with the teeth 11 and permitted to yieldably ride thereover, as the rod is turned by spring 4', by a spring 17 interposed between and bearing on the nut 16 and disk 13. Thus, as wear occurs between the nut 16 and the valve stem, the spring 4' will revolve the rod to extend it farther, and the teeth 12, while riding teeth 11 to allow such feed, prevents a reverse rotation of the rod.

The groove and flange connection between the rod 8 and follower 5 constitutes a detachable connection so that the rod may be easily removed when worn and when inserted the connection is easily established. The spring 4 always maintains the rod 8 extended the full limit as defined by the valve stem, and consequently the accustomed "pounding" is prevented.

Having thus described my invention, what I claim as new and desire to secure by Letters Patent is—

1. In a tappet, a casing having a hardened closed end and an opened end formed with a circular series of teeth, a spring within the casing having one end anchored thereto, a follower fixed to the opposite end of the spring and formed with a groove, a rod threaded in the casing and having a flange entered in the groove of the follower, said rod projecting from the casing and being provided with a longitudinal groove, and a disk having teeth arranged reversely to the teeth of the casing for interlocking therewith, said disk being provided with a feather to engage in the groove of the rod.

2. In a tappet, a casing having a hardened closed end and an opened end formed with a circular series of teeth, a spring within the casing having one end anchored thereto, a follower fixed to the opposite end of the spring and formed with a groove, a rod threaded in the casing and having a flange entered in the groove of the follower, said rod projecting from the casing and being provided with a longitudinal groove, a disk having teeth arranged reversely to the teeth of the casing for interlocking therewith, said disk being provided with a feather to engage in the groove of the rod, and means to hold normally the teeth of the disk interlocked with those of the casing.

3. In a tappet, a casing, a rod threaded therein and projecting therefrom, a spring tending to unscrew the rod to extend the latter from the casing, and means slidable on the rod for being in constant interlocking relation with the casing to hold the rod from turning reversely to the action of the spring.

4. In a tappet, a casing, a rod having adjustable connection with the casing to be rigidly connected thereto against longitudinal stress, means within the casing to extend automatically the rod from the latter as wear occurs, and ratchet means for preventing reverse movement of the rod.

5. In a tappet, a casing, a rod threaded therein, a spring tending to unscrew the rod to extend the same from the casing, and means carried by the rod and constantly interlocking with the casing for preventing a reverse rotation of the rod.

6. In a tappet, a casing, a torsional spring therein, a rod threaded in the casing to be extended therefrom by the action of the spring, and means having interlocking engagement with the casing to hold the rod against rotation reverse to the action of the spring.

7. In a tappet, a casing, a rod movable therein and projecting therefrom, means to extend the rod from the casing as play occurs, and ratchet means between the rod and casing for preventing reverse movement of the rod.

8. In a tappet, a casing, a torsional spring therein, a follower in the casing having connection with the spring, a rod threaded in the casing and having releasable connection with the follower, and means to hold the rod against rotation reverse to the action of the spring.

9. In a tappet, a casing, a spring therein, a follower connected with the spring and formed with a groove, and a rod threaded in the casing and provided with an end flange to engage in the groove of the follower.

10. In a tappet, a casing having a series of teeth at one end, a spring in the casing, a follower attached to the spring, a rod threaded in the casing and projecting from the toothed end thereof, said rod having connection with the follower, and means carried by the rod to engage with the teeth of the casing to hold the rod against rotation reverse to the action of the spring.

In testimony whereof I have signed my name to this specification in the presence of two subscribing witnesses.

RODNEY W. MANNING.

Witnesses:
ADA E. HAGERTY,
J. A. MILLER.